(12) United States Patent
Hsu et al.

(10) Patent No.: US 11,977,251 B1
(45) Date of Patent: May 7, 2024

(54) BACKLIGHT MODULE

(71) Applicant: Coretronic Corporation, Hsin-Chu (TW)

(72) Inventors: Chun-Hsiang Hsu, Hsin-Chu (TW); Yen-Hao Lin, Hsin-Chu (TW); Wei-Hsuan Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/164,633

(22) Filed: Feb. 6, 2023

(51) Int. Cl.
*F21V 8/00* (2006.01)
(52) U.S. Cl.
CPC ......... *G02B 6/0053* (2013.01); *G02B 6/0051* (2013.01)
(58) Field of Classification Search
CPC ................ G02B 6/0053; G02B 5/0231; G02F 1/133607
See application file for complete search history.

(56) References Cited

U.S. PATENT DOCUMENTS

| | | | | |
|---|---|---|---|---|
| 7,967,461 B2* | 6/2011 | Bang | ........................ | G02B 5/02 362/225 |
| 8,553,175 B2* | 10/2013 | Ohta | ....................... | G02B 5/045 349/95 |
| 8,690,373 B2* | 4/2014 | Epstein | ............. | G02F 1/133606 349/64 |
| 2008/0025042 A1* | 1/2008 | Kim | .......................... | F21V 5/02 362/606 |
| 2008/0094845 A1* | 4/2008 | Kusano | ............. | G02F 1/133606 362/339 |
| 2010/0073909 A1* | 3/2010 | Ha | ..................... | G02F 1/133606 362/97.1 |
| 2010/0142188 A1* | 6/2010 | Ha | ........................ | G02B 5/045 362/97.1 |
| 2019/0285949 A1* | 9/2019 | Chen | .................... | G02B 6/0053 |
| 2022/0179264 A1* | 6/2022 | Chen | ................. | G02F 1/133603 |

FOREIGN PATENT DOCUMENTS

| | | |
|---|---|---|
| TW | 201640151 | 11/2016 |
| TW | 201939132 | 10/2019 |

* cited by examiner

*Primary Examiner* — Andrew J Coughlin
(74) *Attorney, Agent, or Firm* — JCIPRNET

(57) ABSTRACT

A backlight module including a light guide plate, a light source, an upper prism sheet, and a lower prism sheet is provided. The light guide plate has a light incident surface and a light emitting surface. The upper prism sheet is disposed at a side of the light emitting surface of the light guide plate. The upper prism sheet includes an upper substrate and first prism microstructures. Cross-sections of the first prism microstructures are isosceles triangles, and apex angles thereof fall within a range of 80 to 90 degrees. The lower prism sheet is disposed between the light guide plate and the upper prism sheet. The lower prism sheet includes a lower substrate and second prism microstructures. Cross-sections of the second prism microstructures are isosceles triangles, and apex angles thereof fall within a range of 100 to 130 degrees.

8 Claims, 6 Drawing Sheets

BACKLIGHT MODULE

BACKGROUND

Technical Field

The invention relates to an optical module, and particularly relates to a backlight module.

DESCRIPTION OF RELATED ART

In a structure of an edge-lit backlight module, in addition to a light source and a light guide plate, it is also necessary to use an optical film to increase an intensity of forward emitted light. Recently, the demand for thinner displays has gradually increased, and to reduce the number of used films is the most important development direction for thinning, and a high-brightness module using two prism sheets is a future development trend.

However, in a high-brightness module where a light guide plate is used in collaboration with two prism sheets with the same prismatic structure, the emitted light may be dispersed, and a viewing angle of the maximum light-emitting brightness is also shifted, resulting in a decrease in energy at a front viewing angle.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a backlight module, where a light shape of emitted light thereof has better light concentration.

An embodiment of the invention provides a backlight module including a light guide plate, a light source, an upper prism sheet, and a lower prism sheet. The light guide plate has a light incident surface and a light emitting surface. The light incident surface is connected to the light emitting surface. The light source is disposed at a side of the light incident surface of the light guide plate, and is configured to emit a plurality of light beams. The upper prism sheet is disposed at a side of the light emitting surface of the light guide plate. The upper prism sheet includes an upper substrate and a plurality of first prism microstructures. The upper substrate has a first surface and a second surface opposite to each other. The first prism microstructures are disposed on the first surface of the upper substrate. Cross-sections of the first prism microstructures are isosceles triangles, and apex angles of the first prism microstructures are greater than or equal to 80 degrees and less than or equal to 90 degrees. The lower prism sheet is disposed between the light guide plate and the upper prism sheet. The lower prism sheet includes a lower substrate and a plurality of second prism microstructures. The lower substrate has a third surface and a fourth surface opposite to each other. The third surface is opposite to the second surface. The second prism microstructures are disposed on the third surface of the lower substrate. Cross-sections of the second prism microstructures are isosceles triangles, and apex angles of the second prism microstructures are greater than or equal to 100 degrees and less than or equal to 130 degrees.

Based on the above description, in the backlight module of an embodiment of the invention, since the apex angles of the first prism microstructures are designed to greater than or equal to 80 degrees and less than or equal to 90 degrees, and the apex angles of the second prism microstructures are designed to greater than or equal to 100 degrees and less than or equal to 130 degrees, in the case of reducing a module thickness, a viewing angle of a light shape of emitted light of the backlight module is corrected and the light shape has better light concentration.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
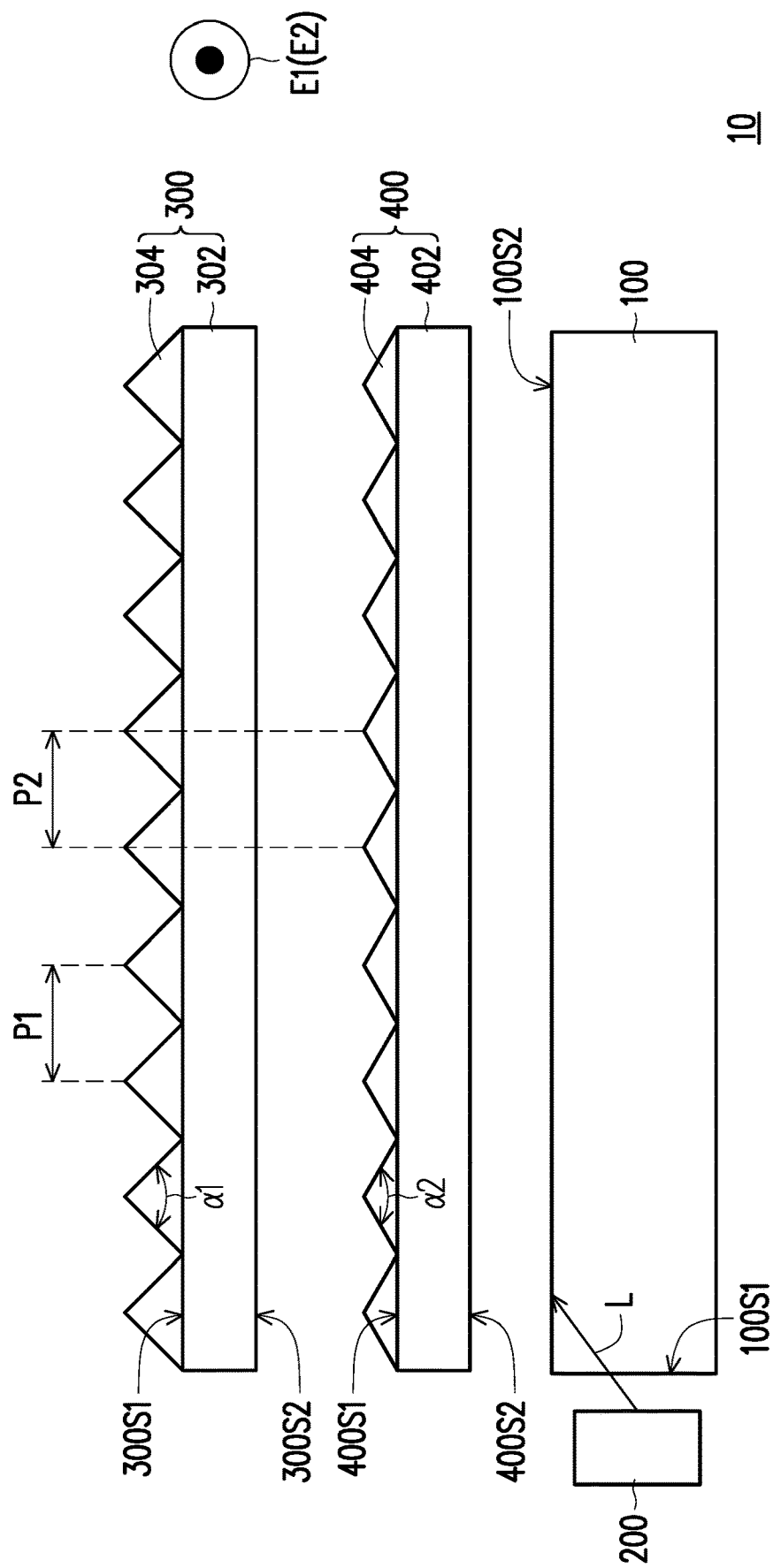
FIG. 1 is a schematic cross-sectional view of a backlight module according to a first embodiment of the invention.

FIG. 1 is a schematic cross-sectional view of a backlight module according to a first embodiment of the invention. Referring to FIG. 1, the embodiment provides a backlight module 10, which includes a light guide plate 100, a light source 200, an upper prism sheet 300 and a lower prism sheet 400.

In the embodiment, a material of the light guide plate 100 may be plastic, glass or other suitable materials, but the invention is not limited thereto. The light guide plate 100 has a light incident surface 100S1 and a light emitting surface 100S2. The light incident surface 100S1 is connected to the light emitting surface 100S2.

In the embodiment, the light source 200 may be a light-emitting diode (LED) or other suitable light sources. The light source 200 is disposed on a side of the light incident surface 100S1 of the light guide plate 100 and configured to emit a plurality of light beams L toward the light incident surface 100S1.

In the embodiment, the upper prism sheet 300 is disposed on a side of the light emitting surface 100S2 of the light guide plate 100. The upper prism sheet 300 includes an upper substrate 302 and a plurality of first prism microstructures 304. A material of the upper substrate 302 may be polyethylene terephthalate (PET), polycarbonate (PC), K-resin (with a refractive index of 1.65) or other suitable materials. A material of the first prism microstructures 304 may be UV glue, K-resin (with a refractive index of 1.65) or other suitable polymers. In the embodiment, the upper substrate 302 has a first surface 300S1 and a second surface 300S2, where the second surface 300S2 faces the light emitting surface 100S2, and the first surface 300S1 faces away from the light emitting surface 100S2. The first prism microstructures 304 are disposed on the first surface 300S1 of the upper substrate 302. The first prism microstructures 304 extends along an extending direction E1, and on a plane perpendicular to the extending direction E1, cross-sections of the first prism microstructures 304 are isosceles triangles (for example, an orthographic projection of the first prism microstructures 304 on the plane perpendicular to the extending direction E1 are isosceles triangles), and apex angles α1 thereof are greater than or equal to 80 degrees and less than or equal to 90 degrees. The extending direction E1 is, for example, parallel to the light incident surface 100S1.

In the embodiment, the lower prism sheet 400 is disposed between the light guide plate 100 and the upper prism sheet 300. The lower prism sheet 400 includes a lower substrate 402 and a plurality of second prism microstructures 404. Similar to the upper prism sheet 300, a material of the lower substrate 402 may be polyethylene terephthalate (PET), polycarbonate (PC), K-resin (with a refractive index of 1.65) or other suitable materials. A material of the second prism microstructures 404 may be UV glue, K-resin (with a refractive index of 1.65) or other suitable polymers. In the embodiment, the lower substrate 402 has a third surface 400S1 and a fourth surface 400S2, where the fourth surface 400S2 faces the light emitting surface 100S2, and the third surface 400S1 faces away from the light emitting surface 100S2. The third surface 400S1 is opposite to the second surface 300S2. The second prism microstructures 404 are disposed on the third surface 400S1 of the lower substrate 402. The second prism microstructures 404 extends along an extending direction E2, and on a plane perpendicular to the extending direction E2, cross-sections of the second prism microstructures 404 are isosceles triangles, and apex angles α2 thereof are greater than or equal to 100 degrees and less than or equal to 130 degrees. The extending direction E2 is, for example, parallel to the light incident surface 100S1. The extending direction E2 is, for example, parallel to the extending direction E1. In a preferred embodiment, the apex angles α1 of the first prism microstructures 304 are 90 degrees, and the apex angles α2 of the second prism microstructures 404 are 120 degrees. Compared with a normal backlight module, the backlight module 10 may enhance brightness by approximately 80% at a front viewing angle (i.e., 0 degrees).

Based on the above description, in the embodiment, the backlight module 10 includes the upper prism sheet 300 and the lower prism sheet 400, the cross-sections of the first prism microstructures 304 of the prism sheet 300 and the second prism microstructures 404 of the lower prism sheet 400 are respectively isosceles triangles, The apex angles α1 of the first prism microstructures 304 are greater than or equal to 80 degrees and less than or equal to 90 degrees, and the apex angles α2 of the second prism microstructures 404 are greater than or equal to 100 degrees and less than or equal to 130 degrees. Therefore, the backlight module 10 may enhance brightness by about 30% to 80% at the front viewing angle compared with the normal backlight module, and a main emitted light range of viewing angle characteristics of the backlight module 10 is corrected (e.g., a viewing angle of the maximum light-emitting brightness is close to the front viewing angle) and concentrated. Moreover, the brightness of the backlight module 10 is also improved.

In the embodiment, a pitch P1 between the first prism microstructures 304 and a pitch P2 between the second prism microstructures 404 are the same as each other, for example, 50 micrometers (μm). Where, the pitch is defined as a repeating distance between the prism microstructures, such as a distance between the apex angles of the adjacent prism microstructures. In order to better solve a problem of moire phenomenon caused by mutual interference between the prism microstructures due to the same pitch, in other embodiments, an included angle between the extending direction E1 of the first prism microstructures 304 and the extending direction E2 of the prism microstructures 404 is greater than or equal to 7 degrees and less than or equal to 21 degrees.

Furthermore, in other embodiments, the first prism microstructures 304 and the second prism microstructures 404 are designed to have the same pitch P1 and P2, and the included angle between the extending direction E1 of the first prism microstructures 304 and the extending direction E2 of the second prism microstructures 404 is designed to greater than or equal to 7 degrees and less than or equal to 21 degrees, the backlight module 10 enhance brightness by about 30% to 50%. For example, when the included angles between the extending direction E1 of the first prism microstructures 304 and the extending direction E2 of the second prism microstructures 404 are 7, 14, 21 degrees, 50%, 41%, and 30% brightness gain may be respectively enhanced. To be specific, the included angle between the extending direction E1 of the first prism microstructures 304 and the extending direction E2 of the second prism microstructures 404 is 14 degrees, for example, the extending direction E2 of the second prism microstructures 404 is parallel to the light incident surface 100S1 and an included angle between the extending direction E1 of the first prism microstructures 304 and the light incident surface 100S1 is 14 degrees, the backlight module 10 has better brightness gain and the moire phenomenon of the backlight module may also be mitigated. Alternatively, the included angle between the extending direction E2 of the second prism microstructures 404 and the light incident surface 100S1 may be 7 degrees, and the included angle between the extending direction E1 of the first prism microstructures 304 and the light incident surface 100S1 may be −7 degrees (with a rotation direction opposite to that of the second prism microstructures 404), and the horizontal viewing angle may be further corrected by the opposite rotation directions of the prism microstructures.

In order to mitigate the moire phenomenon, in another embodiment, the pitch P1 between the first prism microstructures 304 and the pitch P2 between the second prism microstructures 404 may be designed to be different. For example, the pitch P1 between the first prism microstructures 304 is greater than the pitch P2 between the second prism microstructures 404. For example, the pitch P1 between the first prism microstructures 304 is 50 and the pitch P2 between the second prism microstructures 404 may be within a range of 18 to 24 thus mitigating the moire phenomenon. Further, when the pitches P1 and P2 are designed to be different, the included angle between the extending direction E1 of the first prism microstructures 304 and the extending direction E2 of the second prism microstructures 404 may be greater than or equal to 7 degrees and less than or equal to 10 degrees, which may mitigate the moire phenomenon. Namely, when the pitches P1 and P2 are designed to be different, the extending directions E1 and E2 only need to be adjusted by a small angle, which may mitigate the moire phenomenon and meanwhile reduce a rotation angle of the prism sheet, so as to reduce the brightness loss caused by the rotation of the prism sheet.

In general, in an embodiment, the extending direction E1 of the first prism microstructures 304 and the extending direction E2 of the second prism microstructures 404 are not parallel to the light incident surface 100S1. Namely, an included angle between the plane where the light incident surface 100S1 is located and the extending direction E1 or E2 is greater than or less than zero.

Figure 2:
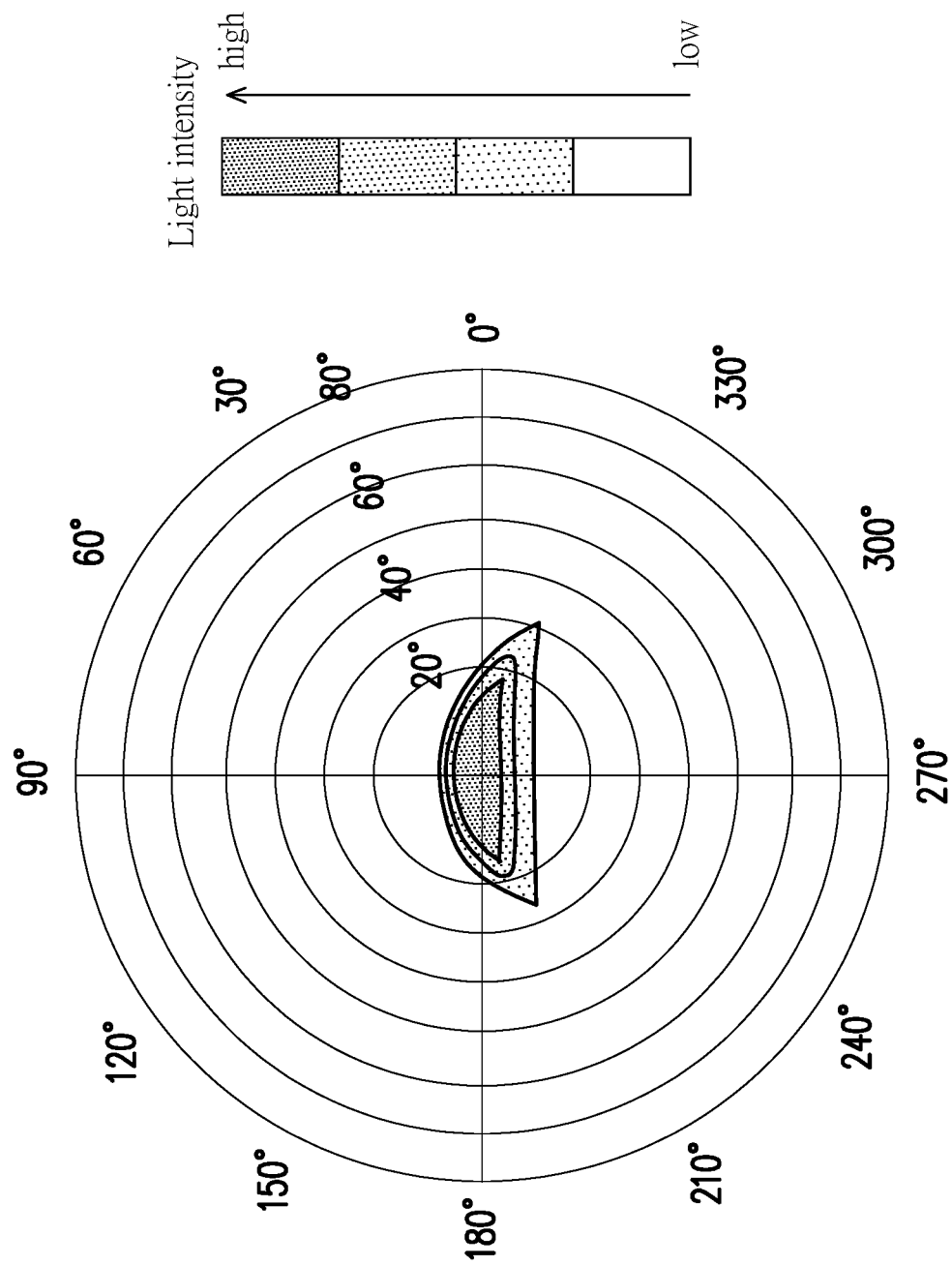
FIG. 2 is a schematic diagram of viewing angle characteristics of the backlight module according to the first embodiment of the invention.

FIG. 2 is a schematic diagram of viewing angle characteristics (light intensity distribution) of the backlight module according to the first embodiment of the invention. Referring to FIG. 1 and FIG. 2 at the same time, in FIG. 2, the pitches P1 and P2 are selected to be 50 μm, the extending direction E1 of the first prism microstructures 304 is rotated by 7 degrees, and the extending direction E2 of the second prism microstructure 404 is rotated by −7 degrees (i.e., the included angles between the light incident surface 100S1 and the extending directions E1 and E2 are both 7 degrees, and the included angle between the extending directions E1 and E2 is 14 degrees). Referring to FIG. 2, when the extending direction E1 of the first prism microstructures 304 and the extending direction E2 of the second prism microstructures 404 of the backlight module 10 are designed to be not parallel to the light incident surface 100S1, the main emitted light range of viewing angle characteristics of the backlight module 10 is corrected and narrowed.

Figure 3:
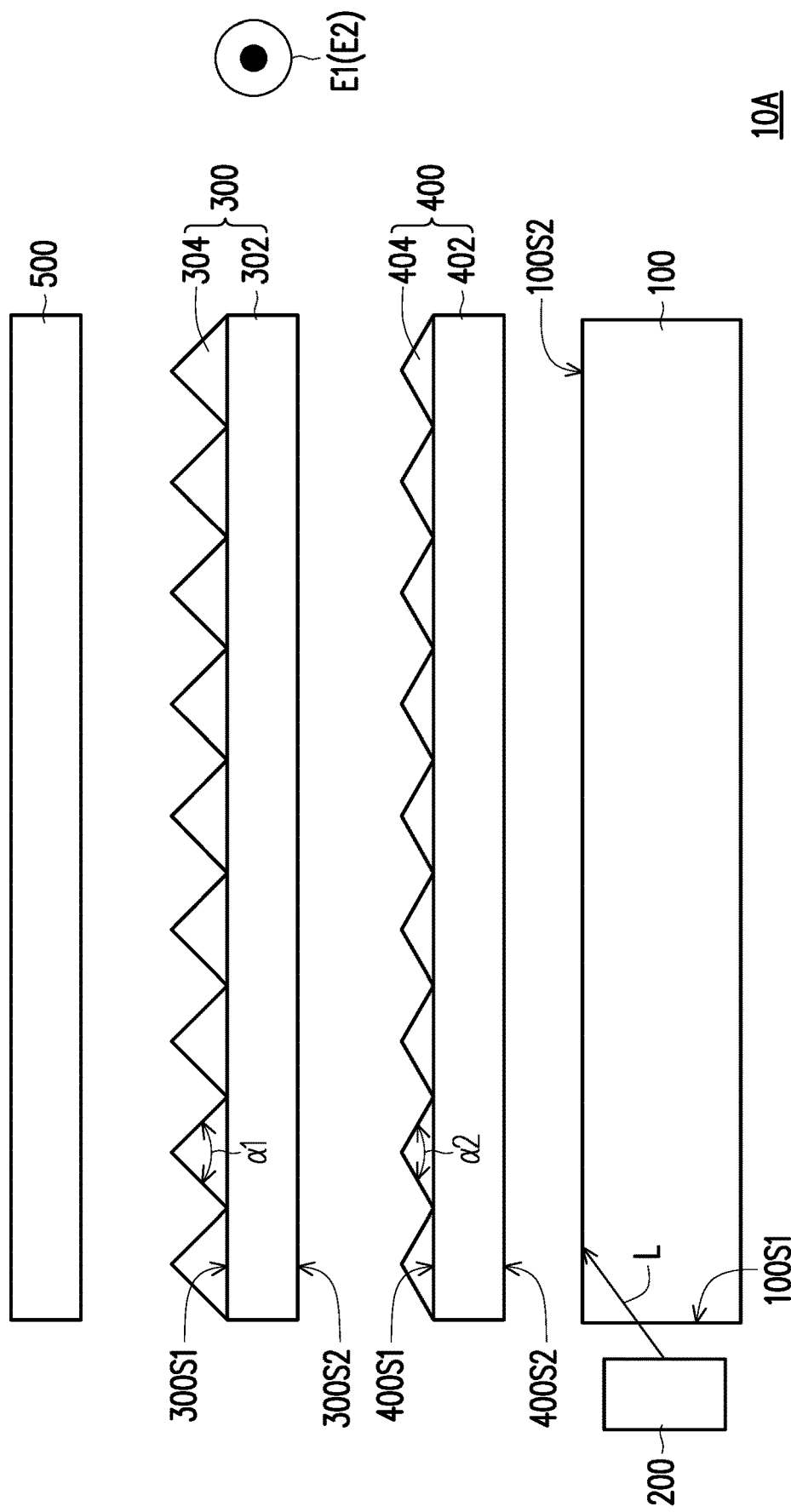
FIG. 3 is a schematic cross-sectional view of a backlight module according to a second embodiment of the invention.

FIG. 3 is a schematic cross-sectional view of a backlight module according to a second embodiment of the invention. Referring to FIG. 3, a backlight module 10A is similar to the backlight module 10 of FIG. 1, a main difference therebetween is that: the backlight module 10A further includes a first diffusion sheet 500. Moreover, in the embodiment, the lower prism sheet 400 is disposed between the first diffusion sheet 500 and the light guide plate 100, and the upper prism sheet 300 is disposed between the first diffusion sheet 500 and the lower prism sheet 400. Where, a haze of the first diffusion sheet 500 preferably falls within a range of 30% to 60%. The included angle between the extending direction E1 of the first prism microstructures 304 and the extending direction E2 of the second prism microstructures 404 is greater than or equal to 0 degrees and less than or equal to 21 degrees, and the extending direction E2 of the second prism microstructures 404 is parallel to the light incident surface 100S1.

In the embodiment, since the backlight module 10A further includes the first diffusion sheet 500, besides that the brightness may be further increased by 10 to 25%, a rainbow pattern of the backlight module may also be mitigated. In addition, the lower the haze of the first diffusion sheet 500 is, the better the effect of brightness gain is, but it still has the effect of mitigating the rainbow pattern.

Figure 4:
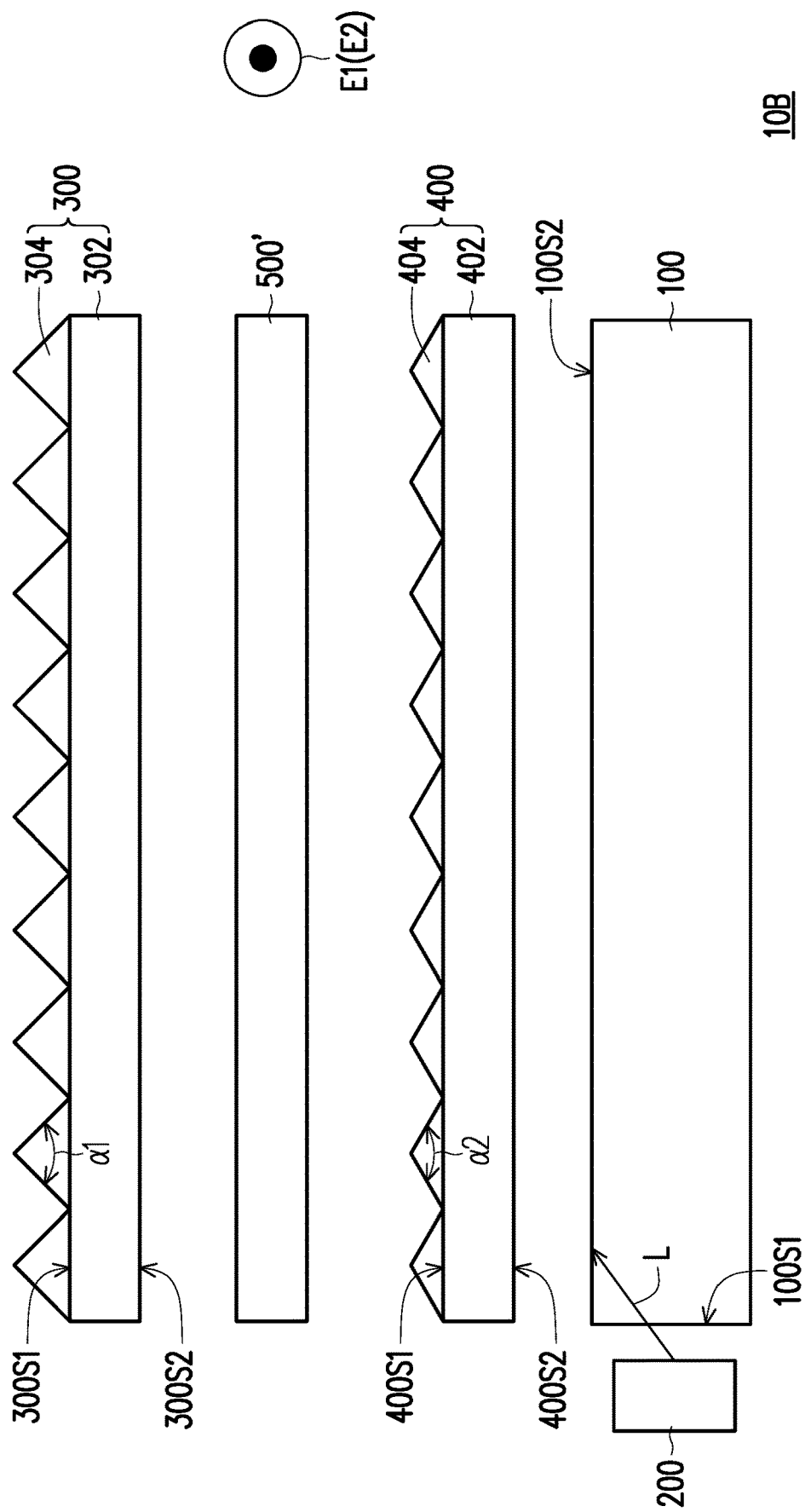
FIG. 4 is a schematic cross-sectional view of a backlight module according to a third embodiment of the invention.

FIG. 4 is a schematic cross-sectional view of a backlight module according to a third embodiment of the invention. Referring to FIG. 4, a backlight module 10B is similar to the backlight module 10A of FIG. 3, and main differences therebetween are as follows. In the embodiment, the lower prism sheet 400 is disposed between the first diffusion sheet 500' and the light guide plate 100, and the first diffusion sheet 500' is disposed between the upper prism sheet 300 and the lower prism sheet 400. The structure of the first diffusion sheet 500 is the same as that of the first diffusion sheet 500', and advantages of the backlight module 10B are similar to that of the backlight module 10A, which will not be repeated here.

Figure 5:
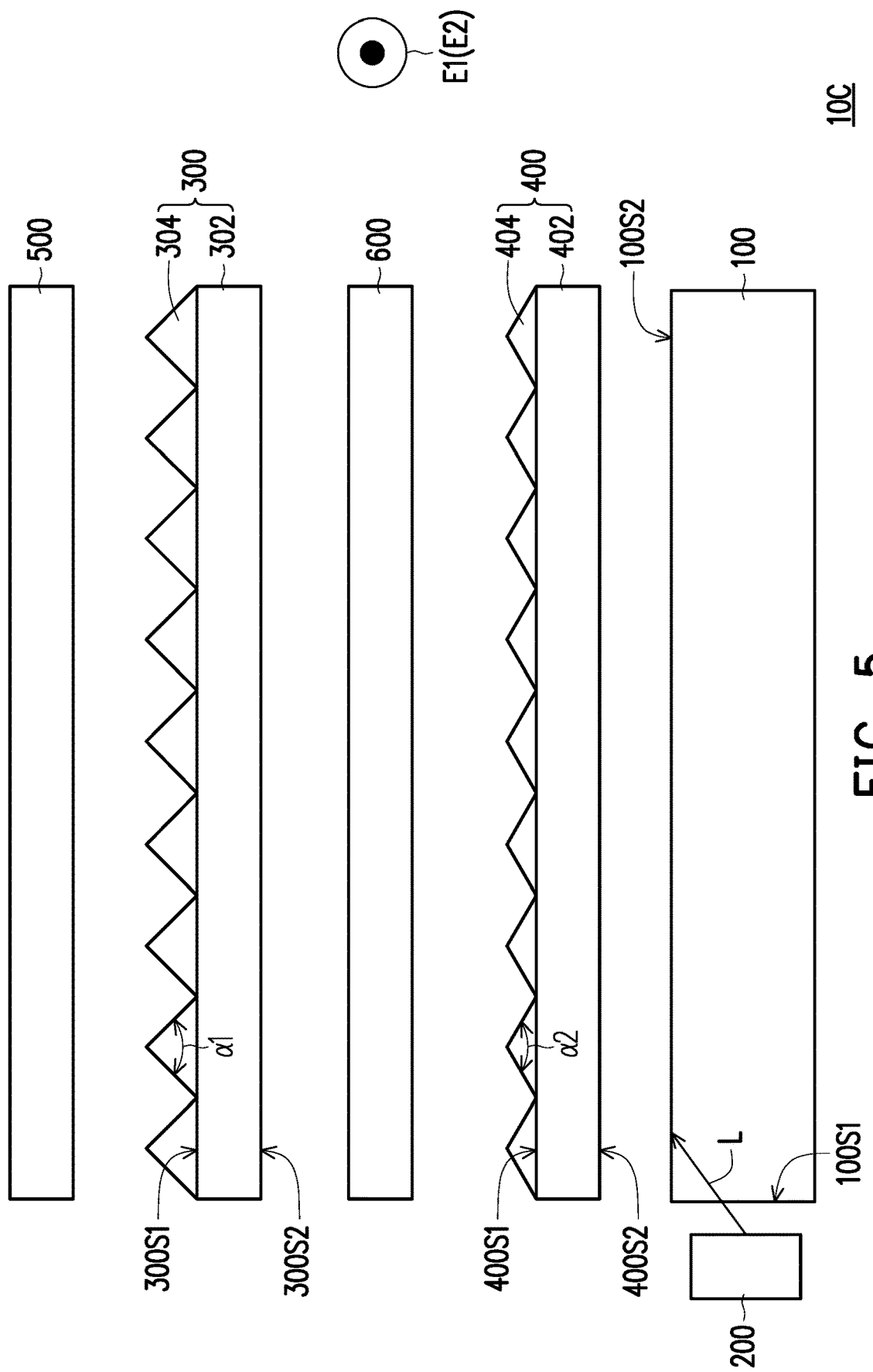
FIG. 5 is a schematic cross-sectional view of a backlight module according to a fourth embodiment of the invention.

FIG. 5 is a schematic cross-sectional view of a backlight module according to a fourth embodiment of the invention. Referring to FIG. 5, a backlight module 10C is similar to the backlight module 10A in FIG. 3, and a main difference therebetween is that the backlight module 10C further includes a second diffusion sheet 600. In the embodiment, the second diffusion sheet 600 is disposed between the upper prism sheet 300 and the lower prism sheet 400, and the lower prism sheet 400 is disposed between the second diffusion sheet 600 and the light guide plate 100. Although the two sets of diffusion sheets 500 and 600 reduce a brightness gain effect slightly, an overall uniformity of the emitted light of the backlight module 10C is better. The other advantages of the backlight module 10C are similar to those of the backlight module 10A, and will not be repeated here.

Figure 6:
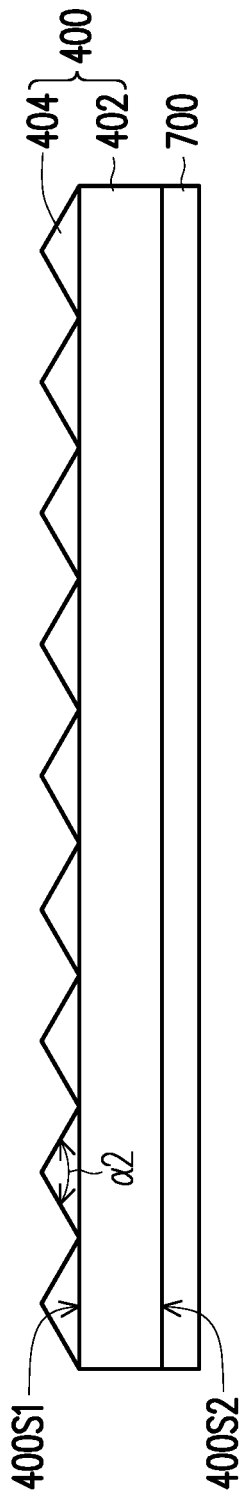
FIG. 6 is a schematic cross-sectional view of an optical adhesive layer configured on a lower prism sheet of a light backlight module according to an embodiment of the invention.
Figure 7A:
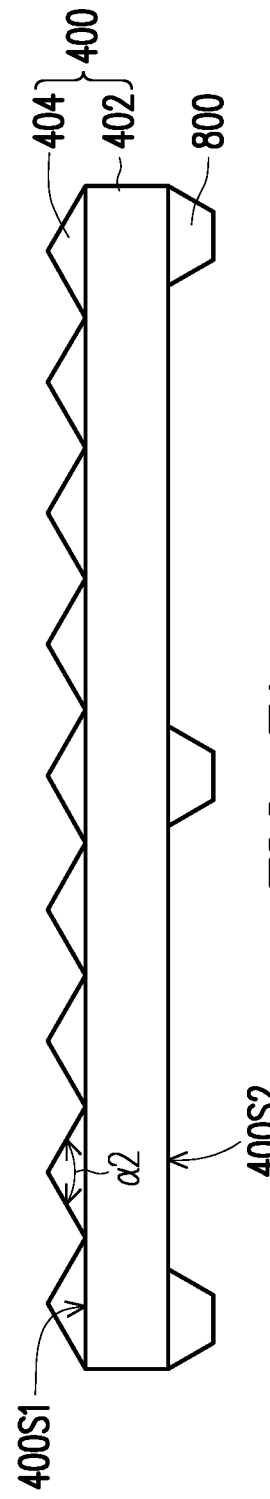
FIG. 7A is a schematic cross-sectional view of pyramidal microstructures configured on a lower prism sheet of a backlight module according to an embodiment of the invention.
Figure 7B:
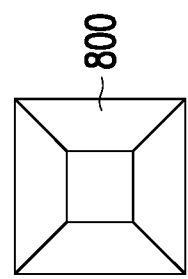
FIG. 7B is a schematic bottom view of the pyramidal microstructure in FIG. 7A.

FIG. 6 is a schematic cross-sectional view of an optical adhesive layer configured on a lower prism sheet of a light backlight module according to an embodiment of the invention. FIG. 7A is a schematic cross-sectional view of pyramidal microstructures configured on a lower prism sheet of a backlight module according to an embodiment of the invention. FIG. 7B is a schematic bottom view of the pyramidal microstructure in FIG. 7A. Referring to FIG. 6, FIG. 7A and FIG. 7B, the backlight module in the embodiment of FIG. 6, FIG. 7A and FIG. 7B is similar to the backlight module 10 in FIG. 1, and a main difference there between is that an optical adhesive layer 700 (FIG. 6) or a plurality of pyramidal microstructures 800 (FIG. 7A) are disposed on the four surface 400S2 of the lower substrate 402 of the lower prism sheet 400. Where, a material of the optical adhesive layer 700 may be K-resin with a refractive index of 1.65, and the pyramidal microstructures 800 preferably have a low density (for example, a distance between the pyramidal microstructures 800 is greater than 0 or greater than the pitch between the second prism microstructures 404). Since the backlight module is provided with the optical adhesive layer 700 or the plurality of pyramidal microstructures 800 on the lower substrate 402, wet-out phenomenon between the lower prism sheet 400 and the light guide plate 100 is avoided. Compared with a backlight module without the optical adhesive layer or the plurality of pyramidal microstructures, the backlight module of the embodiment may increase the brightness gain by 1 to 2%.

In summary, in the backlight module of an embodiment of the invention, since the cross-sections of the first prism microstructures on the upper prism sheet and the second prism microstructures on the lower prism sheet are respectively isosceles triangles, the apex angles of the first prism microstructures are greater than or equal to 80 degrees and less than or equal to 90 degrees, and the apex angles of the second prism microstructures are greater than or equal to 100 degrees and less than or equal to 130 degrees. Therefore, in the case of reducing a module thickness, a viewing angle of a light shape of emitted light of the backlight module is corrected and the light shape has better light concentration. Moreover, the brightness gain of the backlight module is also increased The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements and should not be regarded as limiting the upper or lower bound of the number of the components/devices.

What is claimed is:

1. A backlight module, comprising:
   a light guide plate, having a light incident surface and a light emitting surface, wherein the light incident surface is connected to the light emitting surface;
   a light source, disposed on a side of the light incident surface of the light guide plate, and configured to emit a plurality of light beams;
   an upper prism sheet, disposed on a side of the light emitting surface of the light guide plate, and comprising:
      an upper substrate, having a first surface and a second surface opposite to each other; and
      a plurality of first prism microstructures, disposed on the first surface of the upper substrate, wherein cross-sections of the first prism microstructures are isosceles triangles, and apex angles of the first prism microstructures are greater than or equal to 80 degrees and less than or equal to 90 degrees; and
   a lower prism sheet, disposed between the light guide plate and the upper prism sheet, and comprising:
      a lower substrate, having a third surface and a fourth surface opposite to each other, wherein the third surface is opposite to the second surface; and
      a plurality of second prism microstructures, disposed on the third surface of the lower substrate, wherein cross-sections of the second prism microstructures are isosceles triangles, and apex angles of the second prism microstructures are greater than or equal to 100 degrees and less than or equal to 130 degrees,
      wherein a pitch between the first prism microstructures is greater than or equal to a pitch between the second prism microstructures.

2. The backlight module as claimed in claim 1, wherein an included angle between an extending direction of the first prism microstructures and an extending direction of the second prism microstructures is greater than or equal to 7 degrees and less than or equal to 21 degrees.

3. The backlight module as claimed in claim 2, wherein the extending direction of the first prism microstructures and the extending direction of the second prism microstructures are not parallel to the light incident surface.

4. The backlight module as claimed in claim 1, wherein an included angle between an extending direction of the first prism microstructures and an extending direction of the second prism microstructures is greater than or equal to 7 degrees and less than or equal to 10 degrees.

5. The backlight module as claimed in claim 1, further comprising:
 a first diffusion sheet, wherein the lower prism sheet is disposed between the first diffusion sheet and the light guide plate.

6. The backlight module as claimed in claim 5, wherein an included angle between an extending direction of the first prism microstructures and an extending direction of the second prism microstructures is greater than or equal to 0 degrees and less than or equal to 21 degrees, and the extending direction of the second prism microstructures is parallel to the light incident surface.

7. The backlight module as claimed in claim 5, further comprising:
 a second diffusion sheet, disposed between the upper prism sheet and the lower prism sheet, wherein the upper prism sheet is disposed between the first diffusion sheet and the second diffusion sheet.

8. The backlight module as claimed in claim 1, wherein an optical adhesive layer or a plurality of pyramidal microstructures are disposed on the fourth surface of the lower substrate.

* * * * *